(12) United States Patent
Piroux

(10) Patent No.: US 7,884,994 B2
(45) Date of Patent: Feb. 8, 2011

(54) ELECTROCHROMIC LAYERS, DEVICE AND PROCESS OF PRODUCING SAME

(75) Inventor: Fabienne Piroux, La Plaine Saint Denis (FR)

(73) Assignee: Saint Gobain Glass France, Courbevoie (FR)

( * ) Notice: Subject to any disclaimer, the term of this patent is extended or adjusted under 35 U.S.C. 154(b) by 27 days.

(21) Appl. No.: 12/252,824

(22) Filed: Oct. 16, 2008

(65) Prior Publication Data

US 2009/0097098 A1   Apr. 16, 2009

Related U.S. Application Data

(60) Provisional application No. 60/980,237, filed on Oct. 16, 2007.

(51) Int. Cl.
*G02F 1/01* (2006.01)
(52) U.S. Cl. .................. 359/270; 359/265; 359/272; 359/273; 359/274
(58) Field of Classification Search .......... 359/265–275
See application file for complete search history.

(56) References Cited

U.S. PATENT DOCUMENTS

| | | | |
|---|---|---|---|
| 2002/0196518 A1* | 12/2002 | Xu et al. ............... | 359/245 |
| 2004/0072987 A1* | 4/2004 | Groenendaal et al. ....... | 528/377 |
| 2004/0229049 A1* | 11/2004 | Boire et al. ................. | 428/697 |
| 2007/0183066 A1* | 8/2007 | Varaprasad et al. ......... | 359/844 |
| 2008/0055701 A1* | 3/2008 | Liu et al. .................... | 359/266 |
| 2008/0203910 A1* | 8/2008 | Reynolds .................... | 359/266 |
| 2008/0316574 A1* | 12/2008 | Baumann et al. ............ | 359/273 |
| 2009/0052002 A1* | 2/2009 | Xu et al. ..................... | 359/265 |
| 2009/0242113 A1* | 10/2009 | Radmard et al. ......... | 156/275.5 |

* cited by examiner

*Primary Examiner*—Evelyn A. Lester
(74) *Attorney, Agent, or Firm*—Oblon, Spivak, McClelland, Maier & Neustadt, L.L.P.

(57) ABSTRACT

Provided is an electrochromic device (ECD) that includes: a first transparent electrode having a first substrate having thereon a first electrically conductive layer; a second transparent electrode having a second substrate having thereon a second electrically conductive layer; a first polymeric layer on the first transparent electrode, wherein the first polymeric layer includes a cathodic electrochromic polymer and a first non-electrochromic polymeric matrix; a second polymeric layer on the second transparent electrode, wherein the second polymeric layer includes an anodic electrochromic polymer and a second non-electrochromic polymeric matrix; and an electrolyte layer disposed between the first polymeric layer and the second polymeric layer. Also provided is a process of producing the ECDs, as well as the electrochromic layers themselves.

13 Claims, 3 Drawing Sheets

Voltammetry of the CA45-0549 Ciba polymer deposited on K-glass (cast wet thickness: 60 μm) – liquid electrolyte: 50/50 water/acetonitrile mixture with 0.5M LiClO$_4$ (connection: bare K-glass = working electrode + reference electrode, K-glass + Ciba polymer = counterelectrode) – scan rate: 10 mV/s.

*K-glass covered with a layer of coloured CA45-0549 polymer layer (wet thickness: 120 microns) in a liquid electrolyte (0.5M lithium perchlorate solution in a 50/50 acetonitrile/water mixture.*

US 7,884,994 B2

ELECTROCHROMIC LAYERS, DEVICE AND PROCESS OF PRODUCING SAME

CROSS-REFERENCE TO RELATED APPLICATIONS

The present application claims priority to U.S. provisional patent application 60/980,237, filed on Oct. 16, 2007, which is hereby incorporated by reference in its entirety.

BACKGROUND OF THE INVENTION

1. Field of the Invention

The present invention relates to an electrochromic layers and an electrochromic device and to processes of producing same. Additional aspects and other features of the present invention will be set forth in part in the description that follows and in part will become apparent to those having ordinary skill in the art upon examination of the following or may be learned from the practice of the present invention. The advantages of the present invention may be realized and obtained as particularly pointed out in the appended claims. As will be realized, the present invention is capable of other and different embodiments, and its several details are capable of modifications in various obvious respects, all without departing from the present invention. The description is to be regarded as illustrative in nature, and not as restrictive.

2. Discussion of the Background

Generally speaking, electrochromic materials exhibit a reversible change in absorbance, reflection or transmission of electromagnetic radiation (e.g., any one or more of ultraviolet, visible, infrared, microwave, etc.). This change in absorbance can be induced by an electrochemical oxidation-reduction reaction. Examples of electrochromic materials include transition metal oxides (e.g., tungsten oxide), viologens (1,1'-disubstituted-4,4'-bipyridinium salts), inorganic transition metal complexes (e.g., iron(III) hexacyanoferrate(II)) and conjugated conducting polymers (e.g., polythiophenes, polyalkylenedioxythiophenes, polypyrroles, polyalkylenedioxypyrroles, polycarbazoles and polyanilines). Conjugated conducting polymers are preferred electrochromic materials because the exhibit improved physicochemical properties with respect to color tunability through structural modification, electrochromic contrast, electrochromic efficiency, electrochromic stability, switching speed and processability.

An electrochromic device (ECD) is typically generally designed to modulate absorbed, reflected and/or transmitted incident electromagnetic radiation through the application of an electric field across an electrochromic material present within the device. An example of an ECD is an electrochemical cell that includes two electrodes, an electrolyte and one or more electrochromic materials that undergo a change, for example, an electrochemical oxidation-reduction reaction, upon application of external voltage that modulates the electromagnetic radiation. One typical construction of an ECD is a sandwich structure in which an electrochromic material is deposited onto two transparent electrodes (e.g., glass substrates covered with a transparent conductive oxide) that are separated by an electrolyte (e.g., gel electrolyte, solid electrolyte and/or ionic liquid) disposed therebetween.

To achieve high contrast values upon reversible switching of the electrochromic material between a colored (absorptive) state and a bleached (transmissive) state, two complementary electrochromic materials are sometimes utilized, for example a cathodic electrochromic polymer and an anodic electrochromic polymer. The cathodic electrochromic polymer usually has a low optical bandgap (determined by the onset of the π-π* transition of the polymer in the neutral state) and is colored in the neutral state, becoming transmissive upon oxidation. The anodic electrochromic polymer usually has a high optical bandgap and is transmissive in the neutral state, becoming colored upon oxidation. Therefore, when both polymers are sandwiched together in an ECD and an external voltage is applied, the ECD switches between dark and light, e.g., between a colored state and a transmissive state, with the colored state being the combined colors of both polymers.

Conventional electrochromic devices suffer from various drawbacks including rapid delamination of the electrochromic materials from the surface of the transparent electrodes, thereby rendering the ECD unusable. In addition, it is difficult to obtain a uniform thickness of the electrochromic materials deposited on the surface of the transparent electrodes by conventional methods, thereby resulting in undesirable heterogeneity in the color intensity exhibited by conventional electrochromic devices.

Accordingly, there remains a critical need for an ECD that exhibits a uniform color intensity and does not suffer from rapid delamination of the electrochromic materials from the surface of the transparent electrodes, and a process of producing the ECD by adhering the electrochromic materials in a uniform thickness to the surface of the transparent electrodes.

SUMMARY OF THE INVENTION

The present invention relates to electrochromic layers, electrochromic devices (ECDs) and to processes of producing the same.

An exemplary aspect of the present invention is to provide an ECD that exhibits a uniform color intensity and does not suffer from rapid delamination of the electrochromic materials from the surface of the transparent electrodes.

Another exemplary aspect of the present invention is to provide a process of producing the ECD by adhering the electrochromic materials in a uniform thickness to the surface of the transparent electrodes.

The foregoing discussion exemplifies certain aspects of the present invention. Additional exemplary aspects of the present invention are discussed in the following detailed description of the invention.

DETAILED DESCRIPTION OF THE INVENTION

Figure 1:
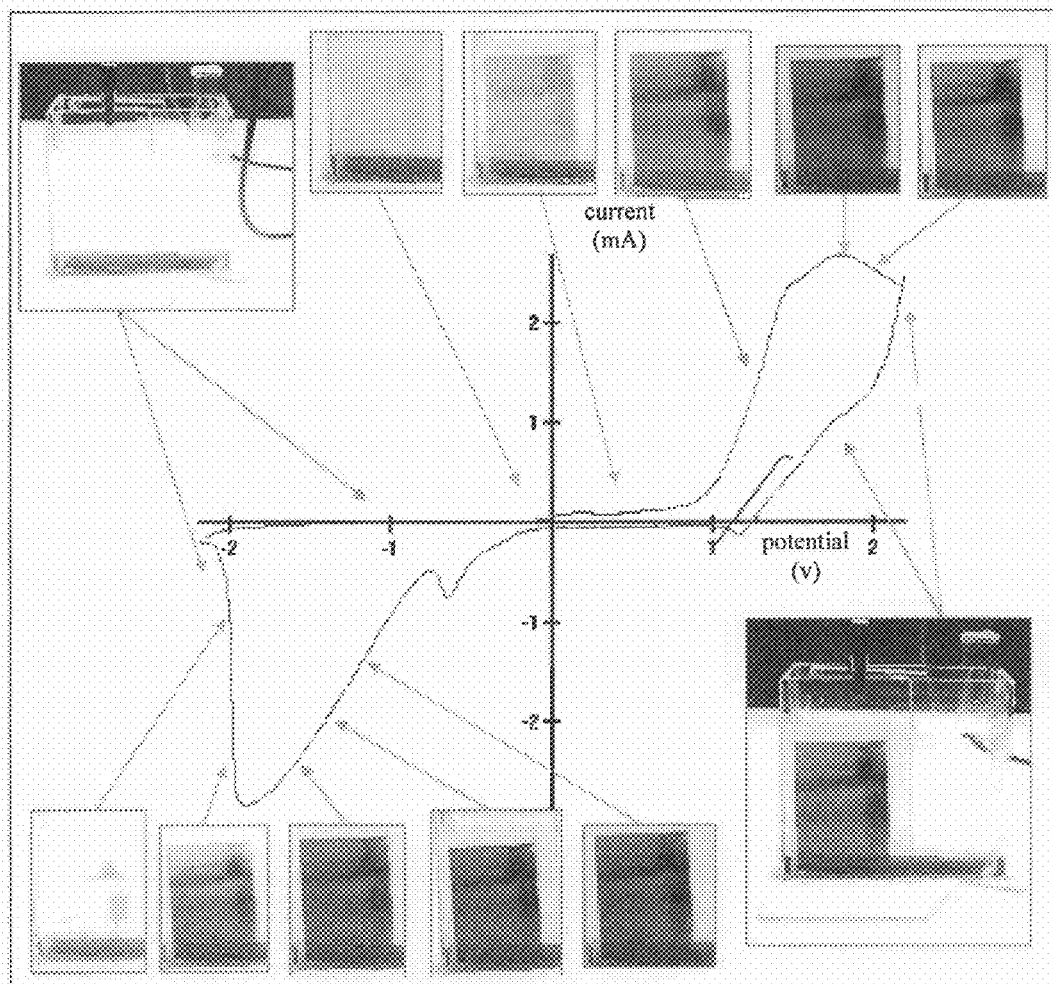
FIG. 1 illustrates varying degrees of non-uniformity in color intensity exhibited by an anodic electrochromic polymer unevenly coated with a conventional method to a wet thickness varying from 30 to 60 μm on a K-glass substrate during cyclic voltammetry.

Unless specifically defined, all technical and scientific terms used herein have the same meaning as commonly understood by a skilled artisan in the relevant technological field.

The processes, materials and examples described herein are for illustrative purposes only and are therefore not intended to be limiting, unless otherwise specified.

Where a numerical range is described herein the endpoints are included as are all values and subranges within or encompassed by the numerical range: these values and subranges are to be considered as specifically included as belonging to the original disclosure of the present application as if these values and subranges had been explicitly written out in their entirety.

The present invention relates to an electrochromic layers and devices and processes of producing the same.

In one embodiment the present application describes an electrochromic device (ECD) that includes: a first transparent electrode having a first substrate having thereon a first electrically conductive layer; a second transparent electrode having a second substrate having thereon a second electrically conductive layer; a first polymeric layer on the first transparent electrode, wherein the first polymeric layer includes a cathodic electrochromic polymer and a first non-electrochromic polymeric matrix; a second polymeric layer on the second transparent electrode, wherein the second polymeric layer includes an anodic electrochromic polymer and a second non-electrochromic polymeric matrix; and an electrolyte layer disposed between the first polymeric layer and the second polymeric layer.

In another embodiment, the present invention provides an ECD that exhibits a uniform color intensity and does not suffer from rapid delamination of the electrochromic materials from the surface of the transparent electrodes.

In another embodiment, the present invention provides for an electrochromic device that includes: a first transparent electrode having a first substrate covered with a first electrically conductive layer; a second transparent electrode having a second substrate covered with a second electrically conductive layer; a first polymeric layer coated on the first transparent electrode, wherein the first polymeric layer includes a cathodic electrochromic polymer and a first non-electrochromic polymeric matrix; a second polymeric layer coated on the second transparent electrode, wherein the second polymeric layer includes an anodic electrochromic polymer and a second non-electrochromic polymeric matrix; and an electrolyte layer disposed between the first polymeric layer and the second polymeric layer.

The first substrate and the second substrate may be the same or different and each may contain one or more substrates, non-limiting examples of which include glass, polyvinyl chloride (PVC), polycarbonate (PC), polyethylene terephthalate (PET), polyamide (PA), polyethylene (PE), polypropylene (PP), poly(methyl methacrylate) (PMMA), poly(ethylene naphthalate) (PEN) and cycloolefin copolymers (COC), as well as derivatives, copolymers, terpolymers, blends and composites thereof. The cycloolefin copolymer includes a copolymer of a cycloalkene and an olefin, wherein non-limiting examples of the cycloalkene include, but are not limited to, cyclopropene, cyclobutene, cyclopentene, cyclohexene, norbornene, cycloheptene, cyclooctene, cyclohexadiene and dicyclopentadiene, and wherein non-limiting examples of the olefin include, but are not limited to, ethylene, propylene, butylene, butadiene and isoprene. Preferred substrates include glass, polycarbonate (PC), polyethylene terephthalate (PET), poly(methyl methacrylate) (PMMA) and poly(ethylene naphthalate) (PEN). Glass is a particularly preferred substrate.

The first electrically conductive layer and the second electrically conductive layer may be the same or different and each may contain one or more electrically conductive materials, non-limiting examples of which include a metal, a transparent conductive oxide and a combination thereof. Non-limiting examples of the metal include at least one transition metal, such as silver, platinum and copper. Non-limiting examples of the transparent conductive oxide include a fluorine doped tin oxide ($F:SnO_2$ or FTO), an indium doped tin oxide ($In_2O_3:SnO_2$ or ITO), an antimony doped tin oxide ($Sb:SnO_2$ or ATO) and an aluminum doped zinc oxide ($Al:ZnO$ or AZO). A non-limiting example of the combination thereof is a TCO/metal/TCO multilayer, wherein the metal may include, but is not limited to, silver, platinum and/or copper, and wherein the transparent conductive oxide (TCO) may include, but is not limited to, a fluorine doped tin oxide ($F:SnO_2$ or FTO), an indium doped tin oxide ($In_2O_3:SnO_2$ or ITO), an antimony doped tin oxide ($Sb:SnO_2$ or ATO) and/or an aluminum doped zinc oxide ($Al:ZnO$ or AZO).

The first polymeric layer preferably includes the cathodic electrochromic polymer and the first non-electrochromic polymeric matrix in a volume ratio of 5-85:100, 10-80:100, 15-75:100, 20-70:100, 25-65:100, 30-60:100, 35-55:100 and 40-50:100. A highly preferred volume ratio of the cathodic electrochromic polymer to the first non-electrochromic polymeric matrix is 10-80:100, with a particularly preferred volume ratio being 30-50:100.

The cathodic electrochromic polymer may contain one or more cathodic electrochromic polymers, non-limiting examples of which include poly(3,4-alkylenedioxythiophene) (PXDOT), poly(3,4-ethylenedioxythiophene) (PEDOT), poly(3,4-propylenedioxythiophene) (PPropOT), poly(3,4-butylenedioxythiophene) (PBuDOT) and polystyrene sulfonate (PSS), as well as derivatives, copolymers, terpolymers, blends and composites thereof.

A complex of poly(3,4-ethylenedioxythiophene) (PEDOT) and polystyrene sulfonate (PSS) is a particularly preferred cathodic electrochromic polymer and is commercially available from H.C. Starck as Clevios™ P (formerly Baytron® P). The cathodic electrochromic polymer may include poly(3,4-ethylenedioxythiophene) (PEDOT) and polystyrene sulfonate (PSS) in a weight ratio of, e.g., 0.25-1.75:1.75-3.25, 0.50-1.50:2.00-3.00 and 0.75-1.25:2.25-2.75. A particularly preferred weight ratio of poly(3,4-ethylenedioxythiophene) (PEDOT) to polystyrene sulfonate (PSS) is 0.50-1.50:2.00-3.00.

The first polymeric layer preferably includes one or more pores having an average pore diameter of 150 µm or less, including for example, 145 µm, 140 µm, 135 µm, 130 µm, 125 µm, 120 m, 115 µm, 110 µm, 105 µm, 100 µm, 95 µm, 90 µm, 85 µm, 80 µm, 75 µm, 70 µm, 65 µm, 60 µm, 55 µm, 50 µm, 45 µm, 40 µm, 35 µm, 30 µm, 25 µm, 20 µm, 15 µm, 10 µm, 5 µm, 1000 nm, 950 nm, 900 nm, 850 nm, 800 nm, 750 nm, 700 nm, 650 nm, 600 nm, 550 nm, 500 nm, 450 nm, 400 nm, 350 nm, 300 nm, 250 nm, 200 nm, 150 nm, 100 nm, 50 nm, 10 nm and 1 nm. The first polymeric layer preferably includes one or more pores having an average pore diameter of 80 µm or less. The first polymeric layer has a pore density of 75% or less, including for example, 70%, 65%, 60%, 55%, 50%, 45%, 40%, 35%, 30%, 25%, 20%, 15%, 10% and 5%.

The first polymeric layer is preferably uniformly coated on the first transparent electrode and has a wet thickness of less than, greater than or equal to 120 µm, including for example, 240 µm, 230 µm, 220 µm, 210 µm, 200 µm, 190 µm, 180 µm, 170 µm, 160 µm, 150 µm, 140 µm, 130 µm, 120 µm, 110 µm, 100 µm, 90 µm, 80 µm, 70 µm, 60 m, 50 µm, 40 µm, 30 µm, 20 µm and 10 µm. The wet thickness of the first polymeric layer uniformly coated on the first transparent electrode varies by an amount of 30 µm or less, including for example, 25 µm, 20 µm, 15 µm, 10 µm and 5 µm.

The second polymeric layer preferably includes the anodic electrochromic polymer and the second non-electrochromic polymeric matrix in a volume ratio of 5-65:100, 10-60:100, 15-55:100, 20-50:100, 25-45:100 and 30-40:100. A highly preferred volume ratio of the anodic electrochromic polymer to the second non-electrochromic polymeric matrix is 10-60:100, with a particularly preferred volume ratio being 40-60:100.

The anodic electrochromic polymer may contain one or more anodic electrochromic polymers, non-limiting examples of which include poly(3,4-alkylenedioxypyrrole) (PXDOP) derivatives, such as poly(3,4-ethylenedioxypyrrole) (PEDOP), poly(N-propanesulfonato-3,4-propylenedioxypyrrole) (PPropOP-NPrS), poly[(2-thiophen-3-yl)ethyl octanoate] (POTE), poly[bis(2-thiophen-3-yl)ethyl decanoate] (PDATE), poly{2-[(3-thienylcarbonyl)oxy]ethyl 3-thiophene carboxylate} (PTOET), poly{2,3-bis[(3-thienyl-carbonyl)oxy]propyl 3-thiophene carboxylate} (PTOPT), poly{3-[(3-thienylcarbonyl)oxy]-2,2-bis[(3-thienylcarbonyl)oxy]propyl 3-thiophene carboxylate} (PTOTPT) and poly[3,6-bis(2-ethylenedioxythienyl)-N-methylcarbazole] (PBEDOT-NMeCz), as well as derivatives, copolymers, terpolymers, blends and composites thereof.

The second polymeric layer preferably includes one or more pores having an average pore diameter of 150 µm or less, including for example, 145 µm, 140 µm, 135 µm, 130 µm, 125 µm, 120 µm, 115 µm, 110 µm, 105 µm, 100 µm, 95 µm, 90 µm, 85 µm, 80 µm, 75 µm, 70 µm, 65 µm, 60 µm, 55 µm, 50 µm, 45 µm, 40 µm, 35 µm, 30 µm, 25 µm, 20 µm, 15 µm, 10 µm, 5 µm, 1000 nm, 950 nm, 900 nm, 850 nm, 800 nm, 750 nm, 700 nm, 650 nm, 600 nm, 550 nm, 500 nm, 450 nm, 400 nm, 350 nm, 300 nm, 250 nm, 200 nm, 150 nm, 100 nm, 50 nm, 10 nm and 1 nm. The second polymeric layer preferably includes one or more pores having an average pore diameter of 80 µm or less. The second polymeric layer has a pore density of 75% or less, including for example, 70%, 65%, 60%, 55%, 50%, 45%, 40%, 35%, 30%, 25%, 20%, 15%, 10% and 5%.

The second polymeric layer is preferably uniformly coated on the second transparent electrode and has a wet thickness of less than, greater than or equal to 120 µm, including for example, 240 µm, 230 µm, 220 µm, 210 µm, 200 µm, 190 µm, 180 µm, 170 µm, 160 µm, 150 µm, 140 µm, 130 µm, 120 µm, 110 µm, 100 µm, 90 µm, 80 µm, 70 µm, 60 µm, 50 µm, 40 µm, 30 µm, 20 µm and 10 µm. The wet thickness of the second polymeric layer uniformly coated on the second transparent electrode varies by an amount of 30 µm or less, including for example, 25 µm, 20 µm, 15 µm, 10 µm and 5 µm.

The first non-electrochromic polymeric matrix and the second non-electrochromic polymeric matrix may be the same or different and each may preferably include any one or more of: an adhesion promoter agent; a pore forming agent; an electrolyte; a solvent; and an optional additive.

The adhesion promoter agent may contain one or more silanes, non-limiting examples of which include an alkyl silane, an amino silane, an aryl silane, a chloro silane, an epoxy silane, a fluoroalkyl silane, a glycol silane and a methacyl silane. Non-limiting examples of the epoxy silane include β-(3,4-epoxycyclohexyl)ethyltrimethoxysilane, γ-glycidoxypropyltrimethoxysilane and combinations thereof. Non-limiting examples of the amino silane include γ-aminopropylsilsesquioxane, γ-aminopropyltriethoxysilane, N-γ-(aminoethyl)-γ-aminopropyltrimethoxysilane, N-β-(aminoethyl)-γ-aminopropylmethyldimethoxysilane, bis(γ-trimethoxysilylpropyl)amine, N-phenyl-γ-aminopropyltrimethoxysilane, Δ-aminohexyltrimethoxysilane, Δ-aminohexylmethyldimethoxysilane, polyazamide silane and combinations thereof. The adhesion promoter agent is preferably one or more glycol silanes, non-limiting examples of which include 3-glycidyloxypropyltrimethoxysilane (GLYMO), 3-glycidyloxypropyltriethyoxysilane (GLYEO) and combinations thereof.

The pore forming agent may contain one or more pore formers, non-limiting examples of which include a high boiling point solvent, a phthalate-based plasticizer, a trimellitate-based plasticizer, an adipate-based plasticizer, a maleate-based plasticizer, a citrate-based plasticizer, a benzoate-based plasticizer and combinations thereof.

Non-limiting examples of the solvent include ethylene carbonate, propylene carbonate, butylene carbonate, diethyl carbonate, ethyl methyl carbonate, trimethyl phosphate, sulfolan, 3-methyl sulfolan, γ-butyrolactone, γ-valerolactone, N-methylpyrrolidinone, N-methyl oxazolidinone, N,N-dimethyl imidazolidinone, dimethyl sulfoxide, dimethyl formamide, dimethyl acetamide, glutaronitrile, succinonitrile, 3-methoxy proprionitrile and combinations thereof. A particularly preferred solvent is a high boiling point solvent, such as propylene carbonate.

Non-limiting examples of the phthalate-based plasticizer include one or more alkyl phthalates, such as dimethyl phthalate, diethyl phthalate, dibutyl phthalate, di-2-ethylhexyl phthalate, di-n-octyl phthalate, diisobutyl phthalate and diisononyl phthalate. Particularly preferred phthalate-based plasticizers include diethyl phthalate, dibutyl phthalate, diisobutyl phthalate, diisononyl phthalate, di-n-octyl phthalate and combinations thereof. Non-limiting examples of the trimellitate-based plasticizer include one or more alkyl trimellitates, such as trimethyl trimellitate and octyl trimellitate. A particularly preferred trimellitate-based plasticizer is trimethyl trimellitate. Non-limiting examples of the adipate-based plasticizer include dioctyl adipate, dibutoxyethyl adipate, dimethoxyethyl adipate, dibutyldiglycol adipate, dialkyleneglycol adipate and combinations thereof. A particularly preferred adipate-based plasticizer is dioctyl adipate. A non-limiting example of the maleate-based plasticizer is dibutyl maleate. Non-limiting examples of the citrate-based plasticizer include trialkyl citrates, such as trimethyl citrate, triethyl citrate, tripropyl, tributyl citrate and combinations thereof. A particularly preferred citrate-based plasticizer is triethyl citrate. A non-limiting example of the benzoate-based plasticiser is methyl benzoate.

The electrolyte may contain one or more polyelectrolytes, non-limiting examples of which include sulfonated polymers, copolymers and/or terpolymers of polytetrafluoroethylene, polyetherketone, polyetheretherketone, polyimide, polystyrene and poly(2-acrylamido-2-methyl-1-propanesulfonic acid).

The electrolyte may contain one or more negatively charged polyelectrolytes associated with one or more cations, wherein non-limiting examples of the negatively charged polyelectrolytes include sulfonated polymers, copolymers and/or terpolymers of polytetrafluoroethylene, polyetherketone, polyetheretherketone, polyimide, polystyrene and poly (2-acrylamido-2-methyl-1-propanesulfonic acid), and wherein non-limiting examples of the cations include $H^+$, $Li^+$, $Na^+$, ammonium, piperidinium, pyridinium, pyridazinium, pyrimidinium, pyrimidinium, pyrrolidinium, pyrrolinium, pyrrolium, pyrazolium, imidazolium, triazolium, oxazolium and combinations thereof.

The electrolyte may contain one or more acids, non-limiting examples of which include sulfuric acid ($H_2SO_4$), trifluoromethanesulfonic acid ($CF_3SO_3H$), phosphoric acid ($H_3PO_4$), polyphosphoric acid ($H_{n+2}PO_{3n+1}$) and combinations thereof.

The electrolyte may contain one or more alkali metal salts, non-limiting examples of which include sodium trifluoromethanesulfonate, lithium trifluoromethanesulfonate, sodium perchlorate, lithium perchlorate, sodium bis(trifluoromethanesulfonyl)imide, lithium bis(trifluoromethanesulfonyl)imide and combinations thereof.

The electrolyte may contain one or more nitrogen-based salts, non-limiting examples of which include ammonium, piperidinium, pyridinium, pyridazinium, pyrimidinium, pyrimidinium, pyrrolidinium, pyrrolinium, pyrrolium, pyrazolium, imidazolium, triazolium, oxazolium and combinations thereof.

The electrolyte may contain one or more imidazolium salts, non-limiting examples of which include 1-ethyl-3-methylimidazolium tetrafluoroborate (emim-BF4), 1-ethyl-3-methylimidazolium trifluoromethane sulfonate (emim-$CF_3SO_3$), 1-ethyl-3-methylimidazolium bis(trifluoromethylsulfonyl)imide (emim-N($CF_3SO_2$)$_2$ or emim-TSFI), 1-butyl-3-methylimidazolium bis(trifluoromethylsulfonyl)imide (bmim-N($CF_3SO_2$)$_2$ or bmim-TSFI) and combinations thereof.

The solvent may contain one or more solvents, non-limiting examples of which include dimethylsulfoxide, N,N-dimethylacetamide, N,N-dimethylformamide, ethylene carbonate, propylene carbonate, butylene carbonate, diethyl carbonate, ethyl methyl carbonate, N-methyl pyrrolidone, γ-butyrolactone, alkylene glycols, alcohols, ketones, nitriles and water. Non-limiting examples of alkylene glycols include ethylene glycol, propylene glycol, trimethylene glycol and combinations thereof. Non-limiting examples of alcohols include methanol, ethanol, n-propanol, isopropanol, n-butanol, isobutanol, sec-butanol, t-butanol, 1,4-butanediol, cyclopentanol, cyclopentanediol, cyclohexanol and combinations thereof. Non-limiting examples of ketones include N-methylpyrrolidinone, γ-butyrolactone, γ-valerolactone, acetone, methyl ethyl ketone, diethyl ketone, methyl propyl ketone, methyl isobutyl ketone, isopropyl methyl ketone, isobutyl methyl ketone, cyclopentanone, cyclohexanone, acetophenone, N-methyl oxazolidinone, N,N-dimethyl imidazolidinone and combinations thereof. Non-limiting examples of nitriles include acetonitrile, propionitrile, butyronitrile, glutaronitrile, succinonitrile, 3-methoxy proprionitrile and combinations thereof.

Non-limiting examples of the optional additive include conductivity enhancers, binders, surfactants, defoamers, crosslinkers and combinations thereof.

The electrolyte layer may contain one or more gel polymer electrolytes including at least one polymer, copolymer and/or terpolymer of poly(ethylene vinyl acetate), polyurethane, polyvinyl butyral, polyimides, polyamides, polystyrene, poly(vinylidene fluoride), polyetherketone, polyetheretherketone, poly(ethylene oxide), polyacrylates, polymethacrylates, polysilanes, poly(epichlorohydrin), sulfonated polytetrafluoroethylene, sulfonated polyetherketone, sulfonated polyetheretherketone, sulfonated polyimide, sulfonated polystyrene and poly(2-acrylamido-2-methyl-1-propanesulfonic acid).

The electrolyte layer may contain one or more negatively charged gel polymer electrolytes associated with one or more cations, wherein non-limiting examples of the negatively charged gel polymer electrolytes include at least one polymer, copolymer and/or terpolymer of poly(ethylene vinyl acetate), polyurethane, polyvinyl butyral, polyimides, polyamides, polystyrene, poly(vinylidene fluoride), polyetherketone, polyetheretherketone, poly(ethylene oxide), polyacrylates, polymethacrylates, polysilanes, poly(epichlorohydrin), sulfonated polytetrafluoroethylene, sulfonated polyetherketone, sulfonated polyetheretherketone, sulfonated polyimide, sulfonated polystyrene and poly(2-acrylamido-2-methyl-1-propanesulfonic acid), and wherein non-limiting examples of the cations include $H^+$, $Li^+$, $Na^+$, ammonium, piperidinium, pyridinium, pyridazinium, pyrimidinium, pyrimidinium, pyrrolidinium, pyrrolinium, pyrrolium, pyrazolium, imidazolium, triazolium, oxazolium and combinations thereof.

The electrolyte layer may contain one or more acids, non-limiting examples of which include sulfuric acid ($H_2SO_4$), trifluoromethanesulfonic acid ($CF_3SO_3H$), phosphoric acid ($H_3PO_4$), polyphosphoric acid ($H_{n+2}PO_{3n+1}$) and combinations thereof.

The electrolyte layer may contain one or more alkali metal salts, non-limiting examples of which include sodium trifluoromethanesulfonate, lithium trifluoromethanesulfonate, sodium perchlorate, lithium perchlorate, sodium bis(trifluoromethanesulfonyl)imide, lithium bis(trifluoromethanesulfonyl)imide and combinations thereof.

The electrolyte layer may contain one or more nitrogen-based salts, non-limiting examples of which include ammonium, piperidinium, pyridinium, pyridazinium, pyrimidinium, pyrimidinium, pyrrolidinium, pyrrolinium, pyrrolium, pyrazolium, imidazolium, triazolium, oxazolium and combinations thereof.

The electrolyte layer may contain one or more imidazolium salts, non-limiting examples of which include 1-ethyl-3-methylimidazolium tetrafluoroborate (emim-BF4), 1-ethyl-3-methylimidazolium trifluoromethane sulfonate (emim-$CF_3SO_3$), 1-ethyl-3-methylimidazolium bis(trifluoromethylsulfonyl)imide (emim-N($CF_3SO_2$)$_2$ or emim-TSFI), 1-butyl-3-methylimidazolium bis(trifluoromethylsulfonyl)imide (bmim-N($CF_3SO_2$)$_2$ or bmim-TSFI) and combinations thereof.

The electrolyte layer may further contain one or more solvents, non-limiting examples of which include dimethylsulfoxide, N,N-dimethylacetamide, N,N-dimethylformamide, ethylene carbonate, propylene carbonate, butylene carbonate, diethyl carbonate, ethyl methyl carbonate, N-methylpyrrolidone, γ-butyrolactone, alkylene glycols, alcohols, ketones, nitriles, ionic liquids, lithium perchlorate, tetrabutylammonium perchlorate and water. Non-limiting examples of alkylene glycols include ethylene glycol, propylene glycol, trimethylene glycol and combinations thereof. Non-limiting examples of alcohols include methanol, ethanol, n-propanol, isopropanol, n-butanol, isobutanol, sec-butanol, t-butanol, 1,4-butanediol, cyclopentanol, cyclopentanediol, cyclohexanol and combinations thereof. Non-limiting examples of ketones include N-methylpyrrolidinone, γ-butyrolactone, γ-valerolactone, acetone, methyl ethyl ketone, diethyl ketone, methyl propyl ketone, methyl isobutyl ketone, isopropyl methyl ketone, isobutyl methyl ketone, cyclopentanone, cyclohexanone, acetophenone, N-methyl oxazolidinone, N,N-dimethyl imidazolidinone and combinations thereof. Non-limiting examples of nitriles include acetonitrile, propionitrile, butyronitrile, glutaronitrile, succinonitrile, 3-methoxy proprionitrile and combinations thereof. A particularly preferred solvent includes a 0.25-0.75M solution of a lithium perchlorate electrolyte and a liquid mixture of water and acetonitrile, wherein the volume ratio of water to acetonitrile is 45-55:55-45.

The present invention also provides for a process of producing electrochromic layers and devices, wherein the process includes: covering the first substrate with the first electrically conductive layer to produce the first transparent electrode; covering the second substrate with the second electrically conductive layer to produce the second transparent electrode; coating the first transparent electrode with the first polymeric layer; coating the second transparent electrode with the second polymeric layer; applying the electrolyte layer to the first polymeric layer and to the second polymeric layer; and joining the first polymeric layer and the second polymeric layer together with the electrolyte layer disposed there between. One alternate is as above, but applying the electrolyte layer to only one of the first polymeric layer and the second polymeric layer.

Coating of the first transparent electrode with the first polymeric layer and coating of the second transparent electrode with the second polymeric layer may be by the same or different coating method, non-limiting examples of which include dip coating, spray coating, brush coating, knife coating, doctor blade coating, curtain coating, roller coating, reel-to-reel coating, spin coating, print coating, screen printing, film casting and combinations thereof.

The process may further involve, after coating the first transparent electrode with the first polymeric layer, after coating the second transparent electrode with the second polymeric layer, and before applying the electrolyte layer to the first polymeric layer and the second polymeric layer (or before applying the electrolyte layer to only one of the first polymeric layer and the second polymeric layer): voltammetric cycling of the first polymeric layer from −3.0 V to +3.5 V at a rate of 10-30 mV/s for a total of 1-5000 cycles; and voltammetric cycling of the second polymeric layer from −4.0 V to +4.0 V at a rate of 10-30 mV/s for a total of 1-5000 cycles. The voltammetric cycling of the first polymeric layer is preferably from −1.0 V to +2.0 V at a rate of 10-30 mV/s for a total of 1-5000 cycles. The voltammetric cycling of the second polymeric layer is preferably from −2.0 V to +2.0 V at a rate of 10-30 mV/s for a total of 1-5000 cycles.

The process may further involve, after coating the first transparent electrode with the first polymeric layer, after coating the second transparent electrode with the second polymeric layer, and before applying the electrolyte layer to one or both of the first polymeric layer and the second polymeric layer: drying the first polymeric layer; and drying the second polymeric layer. Drying of the first polymeric layer and drying of the second polymeric layer may be by the same or different drying method, non-limiting examples of which include evaporation and radiation.

The process may further involve, optionally after drying the first polymeric layer, optionally after drying the second polymeric layer, and before application of electrolyte layer: forming pores in the first polymeric layer and/or forming pores in the second polymeric layer.

The process may further involve forming pores in the first polymeric layer and/or forming pores in the second polymeric layer by the same or different pore forming method, a non-limiting example of which includes removing a pore forming agent present within the first polymeric layer and/or the second polymeric layer with a solvent.

The first non-electrochromic polymeric matrix and the second non-electrochromic polymeric matrix may each comprise a negatively charged polyelectrolyte associated with one or more bulky cations, non-limiting examples of which include ammonium, piperidinium, pyridinium, pyridazinium, pyrimidinium, pyrimidinium, pyrrolidinium, pyrrolinium, pyrrolium, pyrazolium, imidazolium, triazolium, oxazolium and combinations thereof, in which case the process may further involve forming pores in the first polymeric layer and forming pores in the second polymeric layer by the same or different pore forming method, non-limiting examples of which include: removing a pore forming agent present within the first polymeric layer and the second polymeric layer with a solvent; and replacing the one or more bulky cations with one or more non-bulky cations, non-limiting examples of which include $H^+$, $Li^+$, $Na^+$ and combinations thereof.

Applications of the ECD include use as displays, smart windows and optical shutters.

An exemplary aspect of the present invention is that the electrochromic materials are uniformly coated the surface of the transparent electrodes, thereby enabling the ECD to exhibit a uniform color intensity. An additional exemplary aspect of the present invention is that the electrochromic materials are firmly adhered to the surface of the transparent electrodes due to the presence of the adhesion promoter agent. As a result, the ECD in accordance with the present invention does not suffer from the rapid delamination of the electrochromic materials from the surface of the transparent electrodes exhibited by conventional electrochromic devices.

The Inventor has discovered that by adding an adhesion promoter agent to the electrochromic materials, the ECD in accordance with the present invention does not suffer from the rapid delamination of the electrochromic materials from the surface of the transparent electrodes exhibited by conventional electrochromic devices.

The Inventor has also discovered that by adding a pore forming agent to the electrochromic materials, the density of the electrochromic materials is reduced, thereby allowing the electrochromic materials to be uniformly coated onto the surface of the transparent electrodes and enabling the ECD to exhibit a uniform color intensity.

The above written description is provided to thereby enable a skilled artisan to practice the invention described and claimed herein. Various modifications to the exemplary aspects will be readily apparent to those skilled in the art, and general principles and features defined herein may be applied to other non-exemplified aspects without departing from the spirit and scope of the present invention. Thus, the present invention is not intended to be limited to the aspects exemplified herein, but is to be accorded the broadest reasonable scope consistent with the general principles and features disclosed herein.

Sample 1

A poly(3,4-ethylenedioxythiophene) (PEDOT) and polystyrene sulfonate (PSS) cathodic electrochromic polymer complex, which is commercially available from H.C. Starck as Clevios™ P (formerly Baytron® P), and an electrolyte, were deposited in the form of a polymer gel onto two K-glass type electrodes (i.e., glass plates covered with a fluorine doped tin oxide ($SnO_2$:F) electronically conductive layer) and then joined together. In such a configuration, one of the Baytron® P layers acted as an electrochromic layer, switching from pale blue to dark blue when the potential varied from zero to a few volts. The other Baytron® P layer deposited on the counter electrode remained pale blue irrespective of the potential applied and thus did not participate in the colouring effect.

Samples 2 and 3

An anodic electrochromic polymer was alternatively applied to one of the glass plate electrodes of Sample 1.

Two anodic electrochromic polymers supplied by Ciba (CA45-0549 and CA46-0239) were dissolved in toluene and then deposited onto K-glass type electrodes. Following evaporation of the toluene at 140° C. for 30 minutes, a solid film of each of the anodic electrochromic polymers was obtained. Several cyclic voltammetry operations were carried out at a rate of 10 mV/s between about −0.6 V and +1.0 V to condition the anodic electrochromic polymers in an effort to impart cycling durability thereto. The liquid electrolyte used for performing the cyclic voltammetry operations was a 0.1M solution of tetrabutylammonium perchlorate in a 50/50 water/acetonitrile mixture. A platinum counterelectrode and a silver reference electrode were used.

The conditioned anodic electrochromic polymers were then deposited onto K-glass type electrodes. Cyclic voltammetry operations were carried out at a rate of 10 mV/s between about −2.2 V and +2.2 V. The liquid electrolyte used for performing the cyclic voltammetry operations was a 0.1M solution of tetrabutylammonium perchlorate in a 50/50 water/acetonitrile mixture. The anodic electrochromic polymers rapidly delaminated from the K-glass substrate after fewer than 3 cycles.

Samples 4 and 5

The cyclic voltammetry operations of Samples 2 and 3 were repeated, with the exception that the liquid electrolyte used for performing the cyclic voltammetry operations was a 0.5M solution of lithium perchlorate in a 50/50 water/acetonitrile mixture.

An anodic electrochromic polymer solution containing 2% of the anodic electrochromic polymer (CA45-0549) in toluene was unevenly coated to a wet thickness varying from 30 to 60 μm on a K-glass substrate. FIG. 1 illustrates varying degrees of non-uniformity in color intensity exhibited by the anodic electrochromic polymer unevenly coated with a conventional method to a wet thickness varying from 30 to 60 μm on the K-glass substrate during cyclic voltammetry.

Figure 2:
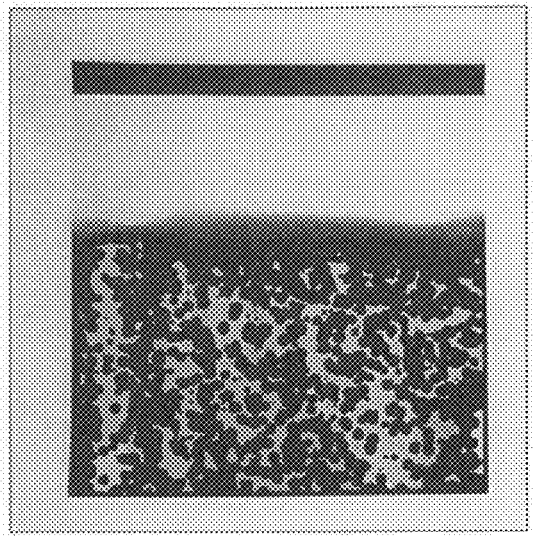
FIG. 2 illustrates severe degrees of non-uniformity in color intensity exhibited by an anodic electrochromic polymer unevenly coated with a conventional method to a wet thickness of 120 μm on portions of a K-glass substrate during cyclic voltammetry.
Figure 3:
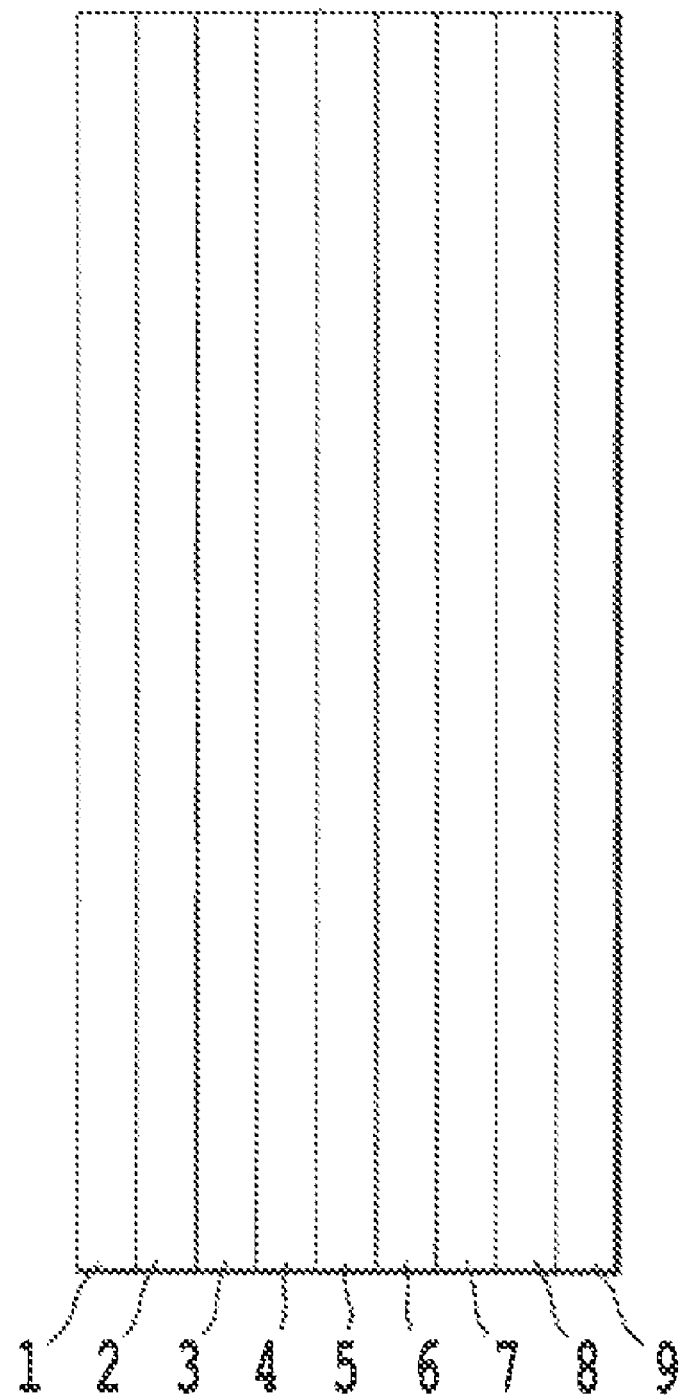
FIG. 3 illustrates an embodiment of the invention having a first transparent electrode (1) having a first substrate (2), a first electrically conductive layer (3), and a first polymeric layer (4) deposited thereon; a second transparent electrode (9) having a second substrate (8), a second electrically conductive layer (7), and a second polymeric layer (6) deposited thereon, wherein an electrolyte layer (5) is disposed between the first polymeric layer (4) and the second polymeric layer (6).

An anodic electrochromic polymer solution containing 2% of the anodic electrochromic polymer (CA45-0549) in toluene was unevenly coated to a wet thickness of 120 μm on portions of a K-glass substrate. FIG. 2 illustrates severe degrees of non-uniformity in color intensity exhibited by the anodic electrochromic polymer unevenly coated with a conventional method to a wet thickness of 120 μm on portions of the K-glass substrate during cyclic voltammetry.

Undesirable heterogeneity in the color intensity exhibited by conventional electrochromic devices is particularly pronounced when the thickness of the electrochromic materials deposited on the surface of the transparent electrodes by conventional methods is 120 μm or more.

In the course of describing the present invention several preferred embodiments have been described, including the following preferred embodiments:

1. An electrochromic device comprising:
a first transparent electrode comprising a first substrate having thereon a first electrically conductive layer;
a second transparent electrode comprising a second substrate having thereon a second electrically conductive layer;
a first polymeric layer over the first transparent electrode, wherein the first polymeric layer comprises a cathodic electrochromic polymer and a first non-electrochromic polymeric matrix;
a second polymeric layer over the second transparent electrode, wherein the second polymeric layer comprises an anodic electrochromic polymer and a second non-electrochromic polymeric matrix; and
an electrolyte layer disposed between the first polymeric layer and the second polymeric layer.

2. The electrochromic device according to embodiment 1, wherein the first substrate and the second substrate may be the same or different and each is one or more substrates selected the group consisting of glass, polyvinyl chloride (PVC), polycarbonate (PC), polyethylene terephthalate (PET), polyamide (PA), polyethylene (PE), polypropylene (PP), poly(methyl methacrylate) (PMMA), poly(ethylene naphthalate) (PEN) and cycloolefin copolymers (COC).

3. The electrochromic device according to embodiment 1, wherein the first substrate and the second substrate may be the same or different and each is one or more substrates selected from the group consisting of glass, polycarbonate (PC), polyethylene terephthalate (PET), poly(methyl methacrylate) (PMMA) and poly(ethylene naphthalate) (PEN).

4. The electrochromic device according to embodiment 1, wherein the first substrate and the second substrate are a glass substrate.

5. The electrochromic device according to embodiment 1, wherein the first electrically conductive layer and the second electrically conductive layer may be the same or different and each are one or more electrically conductive materials selected from the group consisting of a metal, a transparent conductive oxide and a combination thereof.

6. The electrochromic device according to embodiment 1, wherein the first electrically conductive layer and the second electrically conductive layer may be the same or different and each are one or more electrically conductive materials selected from the group consisting of a metal, a transparent conductive oxide and a combination thereof,
wherein the metal is selected from the group consisting of silver, platinum and copper,
wherein the transparent conductive oxide (TCO) is selected from the group consisting of a fluorine doped tin oxide ($F:SnO_2$ or FTO), an indium doped tin oxide ($In_2O_3:SnO_2$ or ITO), an antimony doped tin oxide ($Sb:SnO_2$ or ATO) and an aluminum doped zinc oxide (Al:ZnO or AZO), and
wherein the combination thereof is a TCO/metal/TCO multilayer, wherein the metal is selected from the group consisting of silver, platinum and copper, and wherein the transparent conductive oxide (TCO) is selected from the group consisting of a fluorine doped tin oxide ($F:SnO_2$ or FTO), an indium doped tin oxide ($In_2O_3:SnO_2$ or ITO), an antimony doped tin oxide ($Sb:SnO_2$ or ATO) and an aluminum doped zinc oxide (Al:ZnO or AZO).

7. The electrochromic device according to embodiment 1, wherein the first polymeric layer comprises the cathodic electrochromic polymer and the first non-electrochromic polymeric matrix in a volume ratio of 10-80:100.

8. The electrochromic device according to embodiment 1, wherein the first polymeric layer comprises the cathodic electrochromic polymer and the first non-electrochromic polymeric matrix in a volume ratio of 30-50:100.

9. The electrochromic device according to embodiment 1, wherein the cathodic electrochromic polymer comprises poly(3,4-ethylenedioxythiophene) and polystyrene sulfonate.

10. The electrochromic device according to embodiment 1, wherein the cathodic electrochromic polymer comprises poly(3,4-ethylenedioxythiophene) and polystyrene sulfonate in a weight ratio of 0.5-1.5:2.0-3.0.

11. The electrochromic device according to embodiment 1, wherein the first polymeric layer comprises one or more pores having an average pore diameter of 150 μm or less.

12. The electrochromic device according to embodiment 1, wherein the first polymeric layer comprises one or more pores having an average pore diameter of 80 μm or less.

13. The electrochromic device according to embodiment 1, wherein the second polymeric layer comprises the anodic electrochromic polymer and the second non-electrochromic polymeric matrix in a volume ratio of 10-60:100.

14. The electrochromic device according to embodiment 1, wherein the second polymeric layer comprises the anodic electrochromic polymer and the second non-electrochromic polymeric matrix in a volume ratio of 40-60:100.

15. The electrochromic device according to embodiment 1, wherein the anodic electrochromic polymer is selected from the group consisting of poly(N-propanesulfonato-3,4-propylenedioxypyrrole) (PPropOP-NPrS), poly[(2-thiophen-3-yl) ethyl octanoate] (POTE), poly[bis(2-thiophen-3-yl)ethyl decanoate] (PDATE), poly{2-[(3-thienylcarbonyl)oxy]ethyl 3-thiophene carboxylate} (PTOET), poly{2,3-bis[(3-thienylcarbonyl)oxy]propyl 3-thiophene carboxylate} (PTOPT), poly {3-[(3-thienylcarbonyl)oxy]-2,2-bis[(3-thienylcarbonyl)oxy]propyl 3-thiophene carboxylate} (PTOTPT) and poly[3,6-bis(2-ethylenedioxythienyl)-N-methylcarbazole] (PBEDOT-NMeCz).

16. The electrochromic device according to embodiment 1, wherein the second polymeric layer comprises one or more pores having an average pore diameter of 150 μm or less.

17. The electrochromic device according to embodiment 1, wherein the second polymeric layer comprises one or more pores having an average pore diameter of 80 μm or less.

18. The electrochromic device according to embodiment 1, wherein the first non-electrochromic polymeric matrix and the second non-electrochromic polymeric matrix may be the same or different and each comprise one or more of the following:
an adhesion promoter agent;
a pore forming agent;
an electrolyte;
a solvent; and
an optional additive.

19. The electrochromic device according to embodiment 18, wherein the adhesion promoter agent is one or more silanes selected from the group consisting of an alkyl silane, an amino silane, an aryl silane, a chloro silane, an epoxy silane, a fluoroalkyl silane, a glycol silane and a methacyl silane.

20. The electrochromic device according to embodiment 18, wherein the adhesion promoter agent is a glycol silane selected from the group consisting of 3-glycidyloxypropyltrimethoxysilane (GLYMO), 3-glycidyloxypropyltriethyoxysilane (GLYEO), and combinations thereof.

21. The electrochromic device according to embodiment 18, wherein the pore forming agent is one or more pore formers selected from the group consisting of a high boiling point solvent, a phthalate-based plasticizer, a trimellitate-based plasticizer, an adipate-based plasticizer, a maleate-based plasticizer, a citrate-based plasticizer and a benzoate-based plasticizer.

22. The electrochromic device according to embodiment 18, wherein the pore forming agent is one or more pore formers selected from the group consisting of propylene carbonate, diethyl phthalate, dibutyl phthalate, di-n-octyl phthalate, diisobutyl phthalate, diisononyl phthalate, trimethyl trimellitate, dioctyl adipate, dibutyl maleate, triethyl citrate and methyl benzoate.

23. The electrochromic device according to embodiment 18, wherein the electrolyte is one or more polyelectrolytes selected from the group consisting of sulfonated polymers, copolymers and/or terpolymers of polytetrafluoroethylene, polyetherketone, polyetheretherketone, polyimide, polystyrene and poly(2-acrylamido-2-methyl-1-propanesulfonic acid).

24. The electrochromic device according to embodiment 23, wherein the one or more polyelectrolytes are negatively charged and associated with one or more cations selected from the group consisting of $H^+$, $Li^+$, $Na^+$, ammonium, piperidinium, pyridinium, pyridazinium, pyrimidinium, pyrimidinium, pyrrolidinium, pyrrolinium, pyrrolium, pyrazolium, imidazolium, triazolium and oxazolium.

25. The electrochromic device according to embodiment 18, wherein the electrolyte is one or more acids selected from the group consisting of sulfuric acid ($H_2SO_4$), trifluoromethanesulfonic acid ($CF_3SO_3H$), phosphoric acid ($H_3PO_4$) and polyphosphoric acid ($H_{n+2}P_nO_{3n+1}$).

26. The electrochromic device according to embodiment 18, wherein the electrolyte is one or more alkali metal salts selected from the group consisting of sodium trifluoromethanesulfonate, lithium trifluoromethanesulfonate, sodium perchlorate, lithium perchlorate, sodium bis(trifluoromethanesulfonyl)imide and lithium bis(trifluoromethanesulfonyl)imide.

27. The electrochromic device according to embodiment 18, wherein the electrolyte is one or more nitrogen-based salts selected from the group consisting of ammonium, piperidinium, pyridinium, pyridazinium, pyrimidinium, pyrimidinium, pyrrolidinium, pyrrolinium, pyrrolium, pyrazolium, imidazolium, triazolium and oxazolium.

28. The electrochromic device according to embodiment 18, wherein the electrolyte is one or more imidazolium salts selected from the group consisting of 1-ethyl-3-methylimidazolium tetrafluoroborate (emim-BF4), 1-ethyl-3-methylimidazolium trifluoromethane sulfonate (emim-$CF_3SO_3$), 1-ethyl-3-methylimidazolium bis(trifluoromethylsulfonyl) imide (emim-$N(CF_3SO_2)_2$ or emim-TSFI) and 1-butyl-3-methylimidazolium bis(trifluoromethylsulfonyl)imide (bmim-$N(CF_3SO_2)_2$ or bmim-TSFI).

29. The electrochromic device according to embodiment 18, wherein the solvent is one or more solvents selected from the group consisting of dimethylsulfoxide, N,N-dimethylacetamide, N,N-dimethylformamide, ethylene carbonate, propylene carbonate, N-methylpyrrolidone, γ-butyrolactone, ethylene glycol and derivatives thereof, alcohols, ketones, nitriles and water.

30. The electrochromic device according to embodiment 18, wherein the optional additive is present and is one or more additives selected from the group consisting of conductivity enhancers, binders, surfactants, defoamers and crosslinkers.

31. The electrochromic device according to embodiment 1, wherein the electrolyte layer comprises one or more gel polymer electrolytes.

32. The electrochromic device according to embodiment 31, wherein the one or more gel polymer electrolytes comprise at least one polymer, copolymer and/or terpolymer selected from the group consisting of poly(ethylene vinyl acetate), polyurethane, polyvinyl butyral, polyimides, polyamides, polystyrene, poly(vinylidene fluoride), polyetherketone, polyetheretherketone, poly(ethylene oxide), polyacrylates, polymethacrylates, polysilanes, poly(epichlorohydrin), sulfonated polytetrafluoroethylene, sulfonated polyetherketone, sulfonated polyetheretherketone, sulfonated polyimide, sulfonated polystyrene and poly(2-acrylamido-2-methyl-1-propanesulfonic acid).

33. The electrochromic device according to embodiment 32, wherein the one or more gel polymer electrolytes are negatively charged and associated with one or more cations selected from the group consisting of $H^+$, $Li^+$, $Na^+$, ammonium, piperidinium, pyridinium, pyridazinium, pyrimidinium, pyrimidinium, pyrrolidinium, pyrrolinium, pyrrolium, pyrazolium, imidazolium, triazolium and oxazolium.

34. The electrochromic device according to embodiment 31, wherein the electrolyte layer further comprises one or more acids selected from the group consisting of sulfuric acid ($H_2SO_4$), trifluoromethanesulfonic acid ($CF_3SO_3H$), phosphoric acid ($H_3PO_4$) and polyphosphoric acid ($H_{n+2}P_nO_{3n+1}$).

35. The electrochromic device according to embodiment 31, wherein the electrolyte layer further comprises one or more alkali metal salts selected from the group consisting of sodium trifluoromethanesulfonate, lithium trifluoromethanesulfonate, sodium perchlorate, lithium perchlorate, sodium bis(trifluoromethanesulfonyl)imide and lithium bis(trifluoromethanesulfonyl)imide.

36. The electrochromic device according to embodiment 31, wherein the electrolyte layer further comprises one or more nitrogen-based salts selected from the group consisting of ammonium, piperidinium, pyridinium, pyridazinium, pyrimidinium, pyrimidinium, pyrrolidinium, pyrrolinium, pyrrolium, pyrazolium, imidazolium, triazolium and oxazolium.

37. The electrochromic device according to embodiment 31, wherein the electrolyte layer further comprises one or more imidazolium salts selected from the group consisting of 1-ethyl-3-methylimidazolium tetrafluoroborate (emim-BF4), 1-ethyl-3-methylimidazolium trifluoromethane sulfonate (emim-$CF_3SO_3$), 1-ethyl-3-methylimidazolium bis(trifluoromethylsulfonyl)imide (emim-$N(CF_3SO_2)_2$ or emim-TSFI) and 1-butyl-3-methylimidazolium bis(trifluoromethylsulfonyl)imide (bmim-$N(CF_3SO_2)_2$ or bmim-TSFI).

38. The electrochromic device according to embodiment 31, wherein the electrolyte layer further comprises one or more solvents selected from the group consisting of dimethylsulfoxide, N,N-dimethylacetamide, N,N-dimethylformamide, ethylene carbonate, propylene carbonate, N-methylpyrrolidone, γ-butyrolactone, ethylene glycol and derivatives thereof, alcohols, ketones, nitriles, ionic liquids, lithium perchlorate, tetrabutylammonium perchlorate and water.

39. The electrochromic device according to embodiment 31, wherein the electrolyte layer further comprises a 0.25-0.75M solution of a lithium perchlorate electrolyte and a liquid mixture of water and acetonitrile, wherein the volume ratio of water to acetonitrile is 45-55:55-45.

40. A process of producing the electrochromic device according to claim 1 comprising:
    modifying (which includes, e.g., coating) the first substrate with the first electrically conductive layer to produce the first transparent electrode;
    modifying (which includes, e.g., coating) the second substrate with the second electrically conductive layer to produce the second transparent electrode;
    applying the first polymeric layer to the first transparent electrode;
    applying the second polymeric layer to the second transparent electrode;
    applying the electrolyte layer to at least one of the first polymeric layer and the second polymeric layer; and
    joining the first polymeric layer and the second polymeric layer together with the electrolyte layer disposed there between.

41. The process according to embodiment 40, wherein said coating the first transparent electrode with the first polymeric layer and said coating the second transparent electrode with the second polymeric layer may be by the same or different coating method, wherein the coating method is one or more coating methods selected from the group consisting of dip coating, spray coating, brush coating, knife coating, doctor blade coating, curtain coating, roller coating, reel-to-reel coating, spin coating, print coating, screen printing and film casting.

42. The process according to embodiment 41, wherein the process further comprises, after said coating the first transparent electrode with the first polymeric layer, after said coating the second transparent electrode with the second polymeric layer, and before said applying the electrolyte layer to the first polymeric layer and the second polymeric layer:
    voltammetric cycling of the first polymeric layer from −3.0 V to +3.5 V at a rate of 10-30 mV/s for a total of 1-5000 cycles; and
    voltammetric cycling of the second polymeric layer from −4.0 V to +4.0 V at a rate of 10-30 mV/s for a total of 1-5000 cycles.

43. The process according to embodiment 41, wherein the process further comprises, after said coating the first transparent electrode with the first polymeric layer, after said coating the second transparent electrode with the second polymeric layer, and before said applying the electrolyte layer to the first polymeric layer and the second polymeric layer:
    voltammetric cycling of the first polymeric layer from −1.0 V to +2.0 V at a rate of 10-30 mV/s for a total of 1-5000 cycles; and
    voltammetric cycling of the second polymeric layer from −2.0 V to +2.0 V at a rate of 10-30 mV/s for a total of 1-5000 cycles.

44. The process according to embodiment 41, wherein the process further comprises, after said coating the first transparent electrode with the first polymeric layer, after said coating the second transparent electrode with the second polymeric layer, and before said applying the electrolyte layer to the first polymeric layer and the second polymeric layer:
    drying the first polymeric layer; and
    drying the second polymeric layer.

45. The process according to embodiment 44, wherein said drying the first polymeric layer and said drying the second polymeric layer may be by the same or different drying method, wherein the drying method is one or more drying methods selected from the group consisting of evaporation and radiation.

46. The process according to embodiment 44, wherein said process further comprises, after said drying the first polymeric layer, after said drying the second polymeric layer, and before said applying the electrolyte layer to the first polymeric layer and the second polymeric layer:
    forming pores in the first polymeric layer; and
    forming pores in the second polymeric layer.

47. The process according to embodiment 46, wherein said forming pores in the first polymeric layer and said forming pores in the second polymeric layer are carried out by a pore forming method comprising removing a pore forming agent present within the first polymeric layer and the second polymeric layer with a solvent.

48. The process according to embodiment 46, wherein the first non-electrochromic polymeric matrix and the second non-electrochromic polymeric matrix each comprise a negatively charged polyelectrolyte associated with one or more bulky cations selected from the group consisting of ammonium, piperidinium, pyridinium, pyridazinium, pyrimidinium, pyrimidinium, pyrrolidinium, pyrrolinium, pyrrolium, pyrazolium, imidazolium, triazolium, oxazolium, and wherein said forming pores in the first polymeric layer and said forming pores in the second polymeric layer may be by the same or different pore forming method, wherein the pore forming method is one or more pore forming methods selected from the group consisting of:

removing a pore forming agent present within the first polymeric layer and the second polymeric layer with a solvent; and replacing one or more bulky cations with one or more non-bulky cations selected from the group consisting of $H^+$, $Li^+$ and $Na^+$.

Numerous modifications and variations on the present invention are obviously possible in light of the above disclosure and thus the present invention may be practiced otherwise than as specifically described herein without departing from sprit and scope of the present invention. Accordingly, it is therefore to be understood that the foregoing disclosure is merely illustrative of exemplary aspects of the present invention and that numerous modifications and variations can be readily made by skilled artisans that fall within the scope of the accompanying claims.

The invention claimed is:

1. An electrochromic device comprising:
   a first transparent electrode comprising a first substrate having thereon a first electrically conductive layer;
   a second transparent electrode comprising a second substrate having thereon a second electrically conductive layer;
   a first polymeric layer on the first transparent electrode, wherein the first polymeric layer comprises a cathodic electrochromic polymer and a first non-electrochromic polymeric matrix;
   a second polymeric layer on the second transparent electrode, wherein the second polymeric layer comprises an anodic electrochromic polymer and a second non-electrochromic polymeric matrix; and
   an electrolyte layer disposed between the first polymeric layer and the second polymeric layer.

2. The electrochromic device according to claim 1, wherein the cathodic electrochromic polymer comprises poly(3,4-ethylenedioxythiophene) and polystyrene sulfonate.

3. The electrochromic device according to claim 1, wherein the first polymeric layer comprises one or more pores having an average pore diameter of 150 nm or less.

4. The electrochromic device according to claim 1, wherein the first polymeric layer comprises one or more pores having an average pore diameter of 100 nm or less.

5. The electrochromic device according to claim 1, wherein the second polymeric layer comprises one or more pores having an average pore diameter of 150 nm or less.

6. The electrochromic device according to claim 1, wherein the second polymeric layer comprises one or more pores having an average pore diameter of 100 nm or less.

7. The electrochromic device according to claim 1, wherein the first non-electrochromic polymeric matrix and the second non-electrochromic polymeric matrix may be the same or different and at least one comprises one or more of the following:
   an adhesion promoter agent;
   a pore forming agent;
   an electrolyte;
   a solvent; and
   an optional additive.

8. The electrochromic device according to claim 7, wherein the optional additive is present and is one or more additives selected from the group consisting of conductivity enhancers, binders, surfactants, defoamers and crosslinkers.

9. The electrochromic device according to claim 1, wherein the electrolyte layer comprises one or more gel polymer electrolytes.

10. A process of producing the electrochromic device according to claim 1 comprising:
    modifying the first substrate with the first electrically conductive layer to produce the first transparent electrode;
    modifying the second substrate with the second electrically conductive layer to produce the second transparent electrode;
    applying the first polymeric layer to the first transparent electrode;
    applying the second polymeric layer to the second transparent electrode;
    applying the electrolyte layer to at least one of the first polymeric layer and the second polymeric layer; and
    joining the first polymeric layer and the second polymeric layer together with the electrolyte layer disposed there between.

11. The process according to claim 10, wherein the process further comprises, after said modifying the first transparent electrode with the first polymeric layer, after said modifying the second transparent electrode with the second polymeric layer, and before said applying the electrolyte layer to the first polymeric layer and/or the second polymeric layer:
    voltammetric cycling of the first polymeric layer from −3.0 V to +3.5 V at a rate of 10-30 mV/s for a total of 1-5000 cycles; and
    voltammetric cycling of the second polymeric layer from −4.0 V to +4.0 V at a rate of 10-30 mV/s for a total of 1-5000 cycles.

12. The process according to claim 10, wherein the process further comprises, after said modifying the first transparent electrode with the first polymeric layer, after said modifying the second transparent electrode with the second polymeric layer, and before said applying the electrolyte layer to the first polymeric layer and the second polymeric layer, at least one of the following:
    drying the first polymeric layer; and
    drying the second polymeric layer.

13. The process according to claim 12, wherein said process further comprises, after said drying and before said applying the electrolyte layer, at least one of the following:
    forming pores in the first polymeric layer; and
    forming pores in the second polymeric layer.

* * * * *